April 1, 1958 — E. A. GERBER — 2,829,284

STABLE PIEZOELECTRIC CRYSTALS

Filed Nov. 4, 1953

INVENTOR.
EDUARD A. GERBER
BY
Harry M. Saragovitz
ATTORNEY

United States Patent Office 2,829,284
Patented Apr. 1, 1958

2,829,284

STABLE PIEZOELECTRIC CRYSTALS

Eduard A. Gerber, Oakhurst, N. J., assignor to the United States of America as represented by the Secretary of the Army Application November 4, 1953, Serial No. 390,260

1 Claim. (Cl. 310—9.7)

(Granted under Title 35, U. S. Code (1952), sec. 266)

The invention described herein may be manufactured and used by or for the Government for governmental purposes, without the payment of any royalty thereon.

This invention relates to piezoelectricity and more particularly to stable crystals having a low drive level-frequency effect.

It is known that the frequency of a crystal controlled oscillator circuit is not strictly constant. The variations are due to a number of factors such as variations in the reactive component of the impedance of the remainder of the circuit and, most important, in the amplitude of vibration of the quartz crystal plate. This problem has become very acute especially in situations where units containing plated wire-mounted quartz crystals are utilized and where close frequency tolerances are desired.

Heating of the quartz piezoelectric crystal accounts for a portion of the frequency deviation as the power dissipated therein often raises its temperature by many degrees, the rise in temperature being proportional to the power dissipated. The accompanying frequency variation depends upon the temperature coefficient of the quartz crystal. However, the rise of temperature does not account for all the observed frequency variation. After the variations due to temperature have been eliminated, there remains a frequency perturbation which is proportional to the power dissipated in the plate. This change occurs even in quartz crystals in a temperature range in which the temperature-frequency coefficient is zero. The variations may not only differ in magnitude in quartz crystals of different orientation, but also differ in direction. For example, in AT crystals, the frequency increases as the square of the amplitude, whereas in BT crystals, the frequency decreases as the square of the amplitude.

It is believed that this frequency perturbation, known as the amplitude-frequency effect which occurs even in a temperature range where the temperature coefficient is zero, is due to the strain resulting from thermal gradients in the crystal. Mose crystal units such as AT and BT cuts contain a circular or rectangular quartz plate. The electrodes are deposited on the quartz, usually in a keyhole pattern, and cover a small area near the center of the crystal. Thus, the heat is generated in a limited area in the center producing a temperature gradient in the plate. This temperature gradient is responsible for a thermal strain since the heated central zone is surrounded by a cooler zone of quartz around the circumference. In effect, the central area is constrained and compressed by the ring of cooler quartz. A tensile stress in the X direction in quartz produces a change in the frequency of vibration, whether applied by external forces or by expansion. This effect, through changes in the elastic coefficients, results in the frequency perturbations which are observed. Temperature differences on the order of one degree C. have been sufficient to produce an observed amplitude-frequency effect.

Many methods have been attempted to eliminate this effect. For example, the area of electrode plating on the crystals has been increased. This results in an increase in the static capacitance of the crystal with resultant frequency instability. Different plating metals have been tried with no measurable improvement. The surface of the crystal has been darkened but the results have been negative.

It is, accordingly, the primary object of the present invention to provide a crystal unit having maximum frequency stability.

It is a further object to provide a crystal unit wherein the amplitude-frequency effect is eliminated without any detrimental effect on the crystal parameters.

In accordance with the present invention, there is provided a crystal unit comprising a crystal wafer, a first electrode in abutting contact with one surface of said wafer and having an area substantially coextensive therewith, and a second electrode in abutting contact with the other surface of said wafer and having an area smaller than said surface.

Also, in accordance with the present invention, there is provided a crystal unit comprising a crystal wafer, a first electrode substantially equal in area to said wafer having a concave face in abutting contact with one surface of said wafer to provide an airgap therebetween and a second electrode which has an area smaller than the wafer area and in abutting contact with the center portion of the other surface of said wafer.

For a better understanding of the invention, together with other and further objects thereof, reference is had to the following description taken in connection with the accompanying drawings and its scope will be pointed out in the appended claim.

In the drawings, in Fig. 1 there is shown a vertical cross section of a crystal unit in accordance with an embodiment of the present invention.

Figure 1:
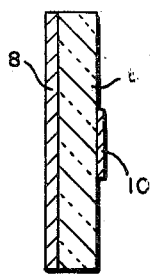

Referring now more particularly to the drawings, a crystal wafer 6 which is of a piezoelectric material such as quartz, rochelle salt, etc., is sandwiched between electrodes 8 and 10. Electrodes 8 and 10 may consist of metals conventionally used in piezoelectric devices such as gold, aluminum, nickel, silver, copper and the like. The faces of electrode 8 are at least coextensive in area with the face area of wafer 6 and electrode 8 is in abutting contact with one face of wafer 6. Electrode 10 is in abutting contact with the center portion of the other face of water 6 and has a smaller face area than the faces of wafer 6, the perimeter of electrode 10 being wholly contained within the wafer face. Electrodes 8 and 10 may be plated onto wafer 6 or may be separate units held in intimate contact therewith by a device such as a wire or mechanical crystal holder.

Figure 2:
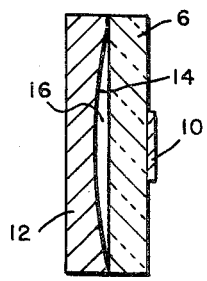
Fig. 2 is a vertical cross-section of a variation of the embodiment of Fig. 1 wherein there is provided an airgap between a separable electrode and the crystal wafer.

Fig. 2 depicts a structure similar to that of Fig. 1 except that electrode 12 which corresponds to electrode 8 of Fig. 1 is a detachable unit and has a concave face 14 in contact and coextensive with an opposing face of crystal 6 so that a suitable airgap 16 is provided between electrode 12 and crystal 6. In this embodiment because of the presence of airgap 16, electrode 12 may be several times thicker than electrode 10 to permit good uniform heat conduction away from the crystal. Electrode 10 may be either detachable or plated onto a face of wafer 6.

Figure 3:
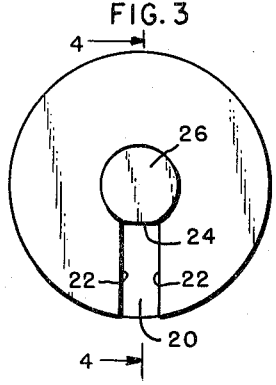
Fig. 3 is a front elevation of another embodiment of the present invention wherein the crystal unit consists of a crystal wafer and two separable electrodes.
Figure 4:
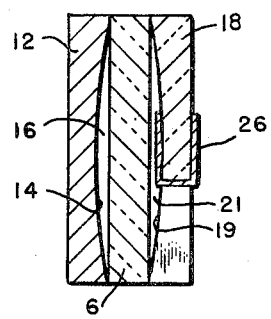
Fig. 4 is a cross-section along line 4—4 of Fig. 3 looking in the direction of the arrows and Fig. 5 is a curve illustrating the frequency stability of the present invention as compared to conventional devices being used for the same purpose.

In Figs. 3 and 4, electrode 10 of Figs. 1 and 2 is replaced by a detachable member 18 which consists of an insulating material such as ceramic and having a face area at least coextensive with the surface area of wafer 6. A cutout portion 20 in member 18 of general rectangular configuration is provided and consists of side walls 22 and transverse wall 24. One face 19 of member 18 which is in contact with a face of wafer 6 is concave thereby providing an airgap 21 between crystal wafer 6 and member 18. A thin metallic layer 26 is provided on the center portions of the faces of member 18, the layers being continuous by means of a metallic layer on wall 24 of cutout portion 20 connecting metallic layers 26 on the center portion of the faces of member 18. The unit of Figs. 3 and 4 is of course designed to be used with a mechanical or wire crystal holder and the electrode 12, crystal 6 and member 18 are all readily detachable individual elements. It is to be understood, of course, that it is not necessary to have a cutout portion in member 18 as metallic layers 26 may be connected through any suitable opening through the member, or may be connected in other manners such as a wire, clamp or the like. In the above described example, the various elements may be circular or of other suitable configuration.

By the embodiment described above, a good heat distribution of the crystal is provided. The electrode 8 or 12 in addition to serving as an electrical contact on the crystal by being relatively thick and equal in area to the crystal serves to convey away uniformly the heat caused by the piezoelectric current passing through the center of the crystal. Thus there is eliminated a cold outer ring of crystal material surrounding a heated inner portion which is believed to be the principal reason for the amplitude-frequency effect as described hereinabove. The electrode 10 or 26, being relatively thin and smaller in area than the other electrode provides the other electrical contact in the crystal unit and due to its small surface area results in a low static capacitance, $C_0$, in the unit, thereby insuring against frequency instability.

Figure 5:
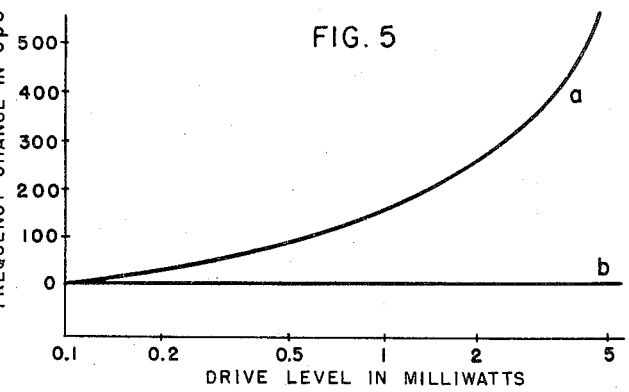

In Fig. 5, there is shown a graph wherein the abscissa represents drive level in milliwatts and the ordinates are frequency change in cycles per second. Curve $a$ shows the results obtained from a crystal unit having conventional electrode arrangements and curve $b$ shows the results obtained from the embodiments of the present invention.

While there have been described what are at present considered to be the preferred embodiments of the invention, it will be obvious to those skilled in the art that various changes and modifications may be made therein without departing from the invention, and it is, therefore, aimed in the appended claim to cover all such changes and modifications as fall within the true spirit and scope of the invention.

What is claimed is:

A crystal unit comprising, a crystal wafer having a first and second face and a peripheral surface joining said faces, a metallic electrode having a concave face bounded by an annular surface in abutting relation with said first face adjacent the peripheral surface of said crystal wafer, a disc of insulating material having a plane face and a concave face, said concave face bounded by an annular surface in abutting relation to said second face adjacent the peripheral surface of said wafer, a thin metallic coating of substantially less area than the area of the faces of said wafer deposited centrally of the concave and plane faces of said insulating disc, and electrical conductive means connecting said metallic coatings.

References Cited in the file of this patent

UNITED STATES PATENTS

| | | |
|---|---|---|
| 2,047,387 | Scott | July 14, 1936 |
| 2,229,172 | Hawk | Jan. 21, 1941 |
| 2,249,933 | Bechmann | July 22, 1941 |
| 2,434,266 | Fruth | Jan. 13, 1948 |
| 2,454,769 | Busnel | Nov. 30, 1948 |
| 2,457,563 | Keller | Dec. 28, 1948 |
| 2,467,353 | Wolfskill | Apr. 12, 1949 |
| 2,487,165 | Miller | Nov. 8, 1949 |
| 2,509,478 | Caroselli | May 30, 1950 |

OTHER REFERENCES

Gerber and Wasshausen: "High Frequency Crystals for Frequency Control-Lapping and Polishing Methods," Signal Corps. Engineering Lab. Eng. Report No. 1080, September 25, 1951. (Published classification of "unclassified.") Note page 5, par. d(2).